United States Patent [19]
Dixit

[11] Patent Number: 5,408,626
[45] Date of Patent: * Apr. 18, 1995

[54] ONE CLOCK ADDRESS PIPELINING IN SEGMENTATION UNIT

[75] Inventor: Ashish Dixit, Fremont, Calif.

[73] Assignee: Intel Corporation, Santa Clara, Calif.

[*] Notice: The portion of the term of this patent subsequent to Apr. 20, 2010 has been disclaimed.

[21] Appl. No.: 142,817

[22] Filed: Oct. 26, 1993

Related U.S. Application Data

[63] Continuation of Ser. No. 942,160, Sep. 8, 1992, abandoned, which is a continuation of Ser. No. 389,749, Aug. 4, 1989, Pat. No. 5,204,953.

[51] Int. Cl.⁶ ........................ G06F 9/34; G06F 12/00; G06F 12/08
[52] U.S. Cl. .................................. 395/400; 364/231.8; 364/238; 364/240; 364/240.2; 364/247; 364/247.4; 364/247.8; 364/254; 364/254.3; 364/255.1; 364/256.3; 364/258; 364/258.1; 364/259; 364/259.9; 364/DIG. 1
[58] Field of Search ................ 395/400, 375; 364/784

[56] References Cited

U.S. PATENT DOCUMENTS 4,594,655  6/1986  Hao et al. ........................... 395/800
4,783,757  11/1988  Krauskopf ........................... 364/784

OTHER PUBLICATIONS

Intel Microprocessor and Peripheral Handbook, vol. 1, 1988, pp. 4-12→4-14, 4-68-4-78.

*Primary Examiner*—Jack B. Harvey
*Assistant Examiner*—Michael A. Whitfield
*Attorney, Agent, or Firm*—Blakely, Sokoloff, Taylor & Zafman

[57] ABSTRACT

A microprocessor which comprises a three input adder, a two input adder, apparatus for providing the components of a virtual address to the first and second adders on a first clock period, and apparatus for providing a segment base address to the first adder on the first clock period, apparatus for determining the type of addresses generated by the adders on a second clock period and for generating an output address on the second clock period, and apparatus for determining access violations during a third clock period.

13 Claims, 2 Drawing Sheets

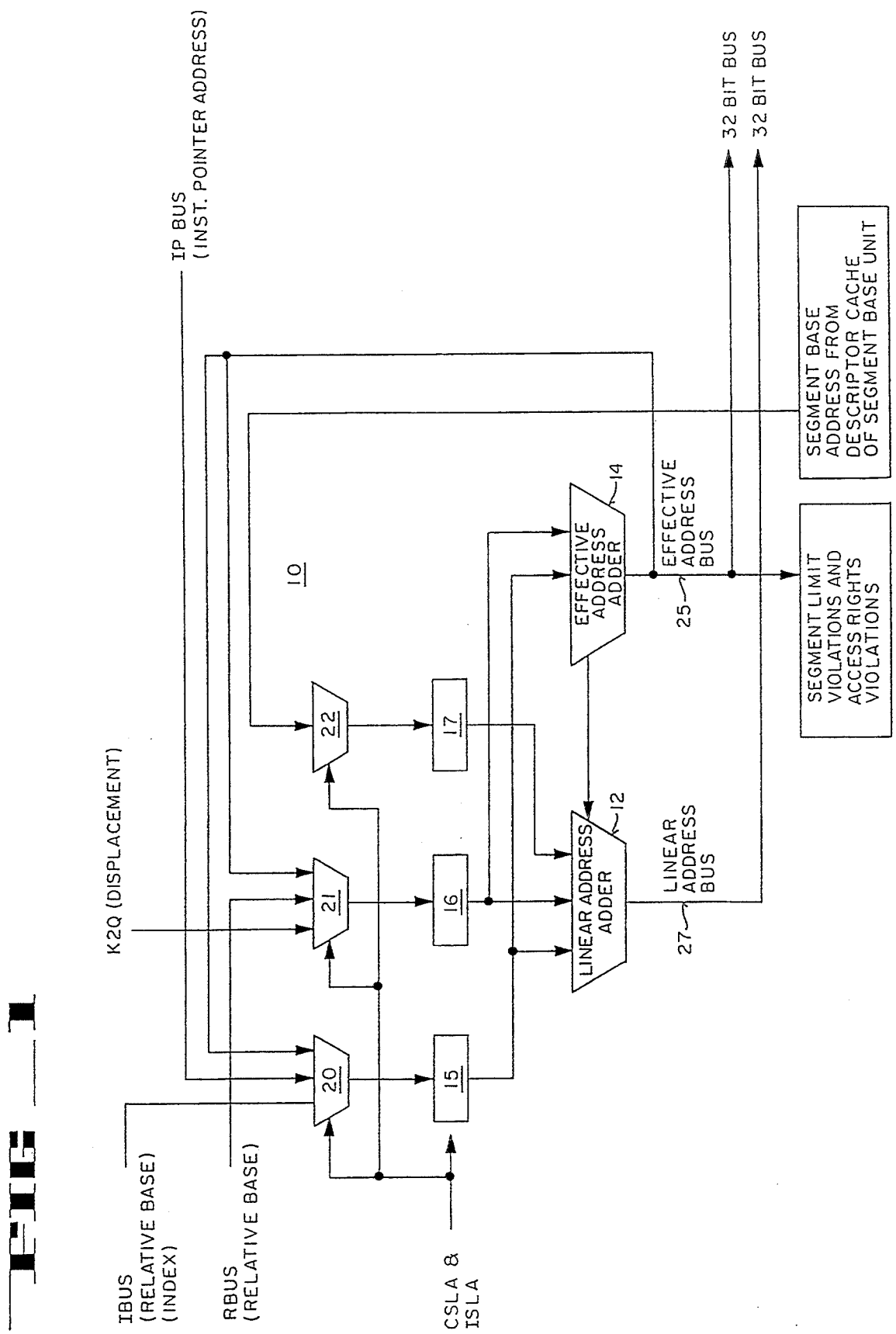
FIG—1

FIG. 2

BASIC TIMING
PHASE1 PHASE2

| STAGE OF PIPELINE | | CLK 1 | CLK 2 | CLK 3 | CLK 4 | CLK 5 | CLK 6 | CLK 7 |
|---|---|---|---|---|---|---|---|---|
| D1 | | (1) ISLA (1) *LINEAR ADDRESS FORMATION CONTROL | (2) ISLA (2) | (3) ISLA (3) | (3) | (3) | (3) | (4) |
| D2 | | IESSEG (1) | IESSEG (2) | IESSEG (3) | | | | (3) |
| | | | (1) GSBR (1) LA(1)__> *LA COMPUTATION & LA BUS DRIVEN | (2) GSBR (2-1) LA(2-1) > | | | | |
| EXECUTE | | | | (1) SEGMENTATION VIOLATION CHECKS ON LA (1) | (2) SEGMENTATION VIOLATION CHECKS ON LA (2-1) CSLA (2-2) DCIMD (2-2) | (2) GSBR (2-2) LA(2-2) CSLA (2-3) DCIMD (2-3) | (2) GSBR (2-3) LA (2-3) SEGMENTATION VIOLATION CHECKS FOR LA (2-2) | (2) SEGMENTATION VIOLATION CHECKS FOR LA (2-3) |
| WRITE BACK | | | | | (1) | | | |

ISLA: EARLY START ADDRESS FORMATION CONTROL.
CSLA: E-STAGE ADDRESS FORMATION CONTROL.
GSBR: EARLY START/E-STAGE BUS CYCLE SPECIFICATION.
IESSEG: DESCRIPTOR ADDRESS FOR EARLY-START ADDRESS FORMATION.
DCIMD: DESCRIPTOR ADDRESS FOR E-STAGE ADDRESS FORMATION.
D1, D2, E, WB: STAGES OF THE 80486 INSTRUCTION PIPELINE.

ONE CLOCK ADDRESS PIPELINING IN SEGMENTATION UNIT

This is a continuation of application, now abandoned Ser. No. 07/942,160, filed Sep. 8, 1992, which is a continuation of application Ser. No. 07/389,749, filed Aug. 4, 1989, now U.S. Pat. No. 5,204,953.

BACKGROUND OF THE INVENTION

1. Field of the Invention

This invention relates to computer systems and, more particularly, to arrangements for generating addresses at a high clock rate within a computer system.

2. History of the Prior Art

The 80386 microprocessor manufactured by the Intel Corporation, Santa Clara, Calif. is a thirty-two bit microprocessor capable of operating at system clock speeds of sixteen megahertz and above and of addressing a very large address base of four gigabytes of physical memory and sixty-four terrabytes of virtual memory. This microprocessor is capable of operating at very high speeds and processing very large amounts of information as compared to previous processors in the Intel family of microprocessors designed for personal computers.

Although the Intel 80386 microprocessor has been a great success, there have been continual demands for increases in its speed and ability to handle information. Consequently, there have been continuous attempts to improve the speed at which this microprocessor operates. For example, in the Intel 80386 microprocessor the generation of an address which requires an access of memory takes at least two clock periods in the execution stage; therefore, every instruction having a memory reference, that is, one requiring an access of memory in its operation, needs at least two clock periods in the execution stage for processing. This requirement, that two system clock periods be used for each address generation has significantly slowed the operation of the Intel 80386 microprocessor.

SUMMARY OF THE INVENTION

It is, therefore, an object of the present invention to accelerate the speed of operation of computer systems and microprocessors in particular.

It is another object of the present invention to reduce the time required to generate addresses in microprocessors based computer systems.

These and other objects of the present invention are accomplished by a microprocessor circuit for providing an address during each execution clock period which circuit comprises a three input adder, a two input adder, means for providing the components of a virtual address to the first and second adders during a first clock period, and means for providing a segment base address to the first adder during the first clock period, means for determining the type of addresses generated by the adders during a second clock period, and means for generating an output address during the second clock period.

These and other objects and features of the invention will become apparent from the reading of the specification taken in conjunction with the drawings in which like reference numerals refer to like elements throughout the several views.

BRIEF DESCRIPTION OF THE DRAWINGS

FIG. 1 is a block diagram illustrating address generation apparatus constructed in accordance with the present invention.

FIG. 2 is a timing diagram useful in illustrating the operation of the present invention.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

The Intel 80386 microprocessor utilizes a memory management system organized to allow both segmentation addressing and demand paged addressing of memory. Such an organization provides many advantages.

Using segmentation addressing, logically associated portions of a program are grouped together in random access memory starting at a beginning or base address and continuing sequentially to the end of that particular segment of random access memory. Such a segment may be of any length available in random access memory. This sequential grouping of information allows a programmer to break his program into logical portions all parts of which have the same characteristics. For example, a programmer might break his program into one segment containing instructions which are designated "read only", another segment containing data which is not to be modified and is also designated "read only", and yet another segment including data which is designated both "read and write" and associate the particular desired characteristics with each selected segment.

Segmentation addressing is useful because it allows each individual segment to be given those particular control and access limits and to be otherwise designated so that all portions of the segment will be treated in the same manner. This is accomplished by the use of a descriptor which is associated with each segment and contains sixty-four bits of information including the base address of the segment, the size limits to which the segment may run in random access memory access and control limitations, and information describing whether the segment has been previously written to.

The demand page addressing policy implemented by the Intel 80386 microprocessor divides physical memory into equal-sized portions referred to as pages each containing four kilobytes of memory. When information is transferred to random access memory (RAM) from secondary memory, a page-sized portion is transferred to a block of physical memory in random access memory. If more information is necessary to the process, that additional information is also transferred to random access memory in page-sized portions. The information at the physical pages of random access memory is assigned virtual addresses by the central processing unit (CPU) which creates page tables associating the virtual and physical addresses. Using the page table translation process, the virtual address is converted to the physical address of the information when it is necessary to access that information.

A demand page addressing system allows a more economic use of memory since pages related to a particular process or application need not be physically associated with one another in memory. Moreover, it provides for the addressing of a great amount of memory by means of virtual addresses even though the physical memory does not exist within random access memory. It is only necessary that secondary memory may be accessed and the information In order to address any information in the Intel 80386 microprocessor whether using segmentation, demand paged addressing, or both, a linear address must first be generated. This linear address is the physical address used by the segmentation unit of the memory management unit for deriving information from random access memory when only the segmentation addressing is enabled. When both the segmentation and page addressing modes of operation of the Intel 80386 microprocessor are enabled, this linear address is transferred to the page map tables where through a translation process the physical address of the particular page in memory (random access of secondary memory) is derived. In either case, the linear address must be generated as the starting address.

In the Intel 80386 microprocessor the linear address is generated from a number of parts including the base address which designates the beginning of any particular segment designated by a process. This base address is referred to as the "segment base address" hereinafter. To this segment base address is added an offset in order to obtain the particular address of the information to be accessed. This offset (called an "effective address" or virtual address) may be made up of a number of components. The first of these components is also called a base address but is actually a relative address within the particular segment starting at the segment base address. This so-called base address will be referred to as the "relative base address" hereinafter.

Although the combination of the segment base address and the relative base address may often constitute the complete linear address, an index which may be multiplied by a number of different factors (0, 1,2, and 4) may also be added to the segment base address to arrive at the linear address. The index is useful in moving large portions of information in memory; for example, it may often be desirable in a particular program to move an array or a string of information from one place to another within random access memory. The index provides a method for accomplishing this readily. In addition, a displacement may be added to the segment base address as a part of the effective address or offset. A displacement is useful, for example, in jump instructions where it is desirable to move by a particular number of memory positions.

The effective address is generated under control of the segmentation unit of the system by adding together the relative base, the index, and any displacement made available. Then, the actual linear address is generated by adding the effective address to the segment base address. In the Intel 80386 microprocessor, this takes a minimum of two clock periods during the execution stage to accomplish. The present invention reduces the time required to generate a linear address at the execution stage from two clock periods to one clock period and, therefore, substantially accelerates the operation of the system.

FIG. 1 illustrates in block diagram form circuitry for accomplishing in parallel the formation of both the effective address and the linear address within the segmentation unit of the microprocessor in accordance with the present invention. The address formation unit 10 includes a pair of adders 12 and 14. The adder 12 is a three-input adder which is referred to as the linear address adder, and the adder 14 is a two-input adder which is referred to as the effective address adder. These adders may be constructed in accordance with principles well known to the prior art. In particular, a three-input adder adapted to effectively provide the formation of linear addresses is illustrated in U.S. Pat. No. 4,783,757 entitled Three-Input Binary Adder, filed Dec. 24, 1985, issued Nov. 8, 1988.

Input to the linear address adder 12 is furnished from three latching registers 15, 16, and 17 which in turn receive input, respectively, from three multiplexers 20, 21, and 22. Inputs to the multiplexer 20 include an effective address (EA) bus, an instruction pointer (IP) bus, and a system "1" bus. The effective address bus carries the effective address resulting from the operation of the effective address adder 14. The IP bus carries the address of the instruction pointer which may be used where a particular address is to be formed from the position of the pointer. The I bus may carry both the index and the relative base address depending on the particular address being formed. The information selected by control signals on control lines CSLA and ISLA by means of the multiplexor 20 is transferred to the register 15 where it is latched, awaiting formation of the linear address.

The I bus transfers information from the "D" unit under control from the "1" unit. The D unit (data unit) contains all of the registers which are used to store user-visible data. The I unit is responsible for converting the code stream of instructions into decoded instruction words to be used by the rest of the computer system to perform the various operations of the system. The I unit also sequences various early start microinstructions to direct operations performed for an instruction before a micro-code takes over the control. The information appearing on the I bus is provided in response to control signals furnished by the system instruction decode unit.

The multiplexer 21 receives inputs on the effective address bus 25, the "R" bus, and the K2Q lines. The effective address appears on the EA bus, a displacement may appear on the K2Q lines, and a relative base address may appear on the R bus. The information selected by control signals on control lines CSLA and ISLA from the system control unit by means of the multiplexor 21 is transferred to the register 16 where it is latched, awaiting formation of the linear address. In like manner, the multiplexer 22 receives the segment base address from the descriptor cache of the segmentation unit and transfers that information under control of the control signals CSLA and ISLA to the register 17 where it is latched, awaiting formation of the linear address.

The information in the registers 15 and 16 is furnished to both the linear address adder 12 and the effective address adder 14 and is sufficient to form a complete effective address and a complete linear address. Thus, either of the latches 15 and 16 may be called upon to hold the relative base address referred to above, while the latch 15 may hold the index and the latch 16 may hold the displacement address. The effective address adder 14 combines these pieces of information in the latches 15 and 16 to provide the effective address which is ultimately provided as output on the effective address bus 25.

In addition, the segment base address stored in the register 17 is added by the linear address adder 12 to the pieces of information in the latches 15 and 16 constituting the effective address to provide the linear address. The linear address adder 12 adds the three inputs for those elements necessary to the particular address to provide an output on a linear address bus 27.

It should be noted that it is not usual for each of a relative address, an index, and a displacement to be required for the formation of an effective address. Consequently, only two inputs are provided to the effective address adder 14. In those few instances in which all three elements are necessary to the formation of the effective address, a two step process is used for its formation. In such a situation, an interim effective address is formed in the effective address adder 14 and fed back to either the latch 15 or 16 via the multiplexor 20 or 21. This interim effective address is then combined with the remaining element of the effective address during a next clock period. In like manner, the interim effective address held in the selected latch is combined with the other elements of the linear address by the linear address adder 12 where all three elements of the effective address are necessary.

It should also be noted that the effective address bus is sampled by the segmentation unit in order to determine whether any limit violations or access rights violations have occurred. If any such violations have occurred a system interrupt is generated to provide for the violation.

FIG. 2 is a timing diagram which illustrates the sequence of signals in the operation of the block diagram illustrated in FIG. 1. FIG. 2 should assist in understanding the operation of the invention. Across the top of the timing diagram of FIG. 2 are shown a number of clock periods, each of which is divided into a positive-going phase one followed by a negative-going phase. Along the left side of the timing diagram are shown the particular stages of the pipeline in which operations are being accomplished. The D-1 stage of the pipeline is the first of two pre-execution stages, the D-2 stage is a second pre-execution stage, the E-stage is the execution stage of the pipeline, and the WB-phase is the write-back stage of the pipeline. In each of the clock periods for each of the stages, the signals are referred to by a number indicating the particular instruction involved; in this manner, the instruction to which each signal applies may be easily determined.

During phase two of the first clock period, a signal ISLA [1] is sent from the "1" unit by means of ISLA control lines to begin the formation of the linear address for the first instruction. The ISLA [1] signal is an early-start address formation control signal and, essentially, is a decoded instruction which defines those buses which should be latched to the registers 15, 16, and 17 and when they should be so latched. In the same phase two of clock period one, another control signal IESSEG [1] is provided by the "1" unit to the segmentation unit. This control signal IESSEG [1] provided by the I unit describes the particular one of the segment base addresses to use.

It will be recalled that in implementing the segmentation process of memory management in the above-described system, each segment has provided a 64bit descriptor of the particular segment, including its segment base address, its size limits, all access rights pertaining to the segment, and information as to whether the segment has been previously written to. In dealing with a particular segment, a load selector instruction loads the descriptor for the segment involved into a descriptor cache in the segmentation unit. Consequently, the segmentation unit has at hand in its descriptor cache the segment base address, the limits, and the access rights of the segment being handled.

The signal IESSEG [1] for the first linear address accesses the descriptor cache for the segment base address and other information necessary to the formation of the first linear address. Consequently, in phase one of clock period two, the information necessary to the formation of the linear address and the effective address is latched into the registers 15, 16, and 17 of the segmentation unit.

At clock period two, phase two, the linear address adder 12 accomplishes the necessary addition. At cycle two, phase two, the signal GSBR [1] causes a linear address to be driven onto the linear address bus 27. The signal GSBR [1] is used to describe the type of address generated. Thus it will be seen that during the first D1 and second D2 pre-execution stages of the operation, the linear address components have been latched to the input of the linear address adder 12,and furnished to the output on the linear address bus 27.

During the same clock periods, these control signals cause the generation of the effective address by the effective address adder 14 using the same information contained in registers 15 and 16 and place the output of the adder 14 on the effective address bus 25. At the execution stage of the pipeline at clock period three, the segmentation unit conducts a violation check on the effective address generated and placed on the effective address bus 25 to determine whether any access or limit violations have occurred. The violation checks are conducted in clock period three by a violation check unit of the segmentation unit so that if any violations occur, an interrupt signal may be generated.

At the time that the linear address is being computed for the first instruction in stage D-2 at phase two of clock period two, a second instruction is being initiated by the signal ISLA [2] and the signal IESSEG [2] furnished by the I unit of the system. As with the signals furnished for the first instruction which cause the formation of the first linear address, the ISLA [2] signal is an early-start address formation signal which directs the buses to provide the data to the registers 15, 16, and 17 and at what times. The signal IESSEG [2] describes the segment base address which is to be used in forming the address. Thus, while the first linear address is being formed and provided as output on the linear address bus 27, the elements of the address for the second instruction are being latched in the registers 15, 16, and 17.

Then, during phase one of clock period three when the segmentation violation checks are being conducted on the first linear address, phase two, a signal GSBR [2-1] is provided which describes the type of bus cycle for the first portion of the second instruction, The second instruction being described herein is an instruction which requires four clock pulses for complete implementation. Such an instruction might, for example, be a load DS instruction such as is described above which loads the 64 bit descriptor of the particular segment into a register. Such an instruction, because of the length of the information which it must handle, may require a number of addresses and thus a number of clock pulses to execute.

In phase two of clock period three, while the segmentation violation checks are being conducted for the previous instruction address, the first linear address of the second instruction is generated by the linear address adder 12 and provided on the linear address bus 27. At clock period four, the violation checks are conducted for the first address of the second instruction in the execution stage of the pipeline. In phase one of clock period four, a signal CSLA [—2] and a signal DCIMD [2—2] are provided from the control unit of the system and the D unit of the system. The signal CSLA is a formation control signal (analogous to the signal ISLA) defining the particular buses to latch in for the registers 15, 16, and 17 and when those buses are to latch for the second linear address to be generated by the second instruction. Consequently, during clock period four while the segmentation violation checks are being conducted on the first linear address generated for the second instruction, the components of the next linear address are being set up in the registers prior to the generation of the second linear address of the second instruction by the linear address register 12 and the second effective address by the effective address adder 14.

At clock period five, during phase one, a GSBR [2—2] signal is provided to designate the particular bus to be utilized for the second address of the second instruction. This is followed at phase two of clock five by the actual generation of the second linear address. Also during phase one of clock five, the address formation control signal CSLA [2-3] for the third linear address to be generated by the second instruction and a signal DCIMD [2-3] for the same linear address of instruction two are generated to designate the particular address formation information in the segment which is involved.

In the first phase of clock six, the bus specifications are designated by a signal GSBR [2-3] and the third linear address of the second instruction is generated at phase two of clock six. At phase one of clock six the checks for the second linear address are also conducted.

Finally, at phase one of clock period seven, the segmentation violation checks for the third linear address of the second instruction are conducted.

It will be noticed that the system provides a segmentation violation check on a first linear address generated in the execution phase at clock period three, a second linear address segmentation violation check completing a second linear address on clock four, a segmentation violation check at clock six completing the execution of the second linear address for the second instruction, and a segmentation violation check at clock period seven completing the execution of the third linear address for the second instruction. Thus, it may be seen that a linear address may be promulgated by the system of this invention at each clock time in the operation of the system. Such an arrangement allows the operation of the system to be accelerated appreciably so that a significantly larger number of instructions may be handled at any particular period of time.

Although the invention has been described in a preferred embodiment, it will be clear to those skilled in the art that many modifications may be made to the invention described without departing from the spirit and scope of the invention. It will, therefore, be appreciated that the invention should be considered to be particularly defined by the claims which follow.

What is claimed is:

1. In a microprocessor device, a method for generating addresses for consecutive memory references comprising the steps of:
   a) receiving a first signal identifying a first set of address components for a first linear address and a first effective address for a first memory reference on a first clock cycle;
   b) generating said first linear address and said first effective address for said first memory reference from said first set of address component on a second clock cycle;
   c) receiving a second signal identifying a second set of address components for a second linear address and a second effective address for a second memory reference on said second clock cycle; and
   d) generating said second linear address and said second effective address for said second memory reference from said second set of address components on a third clock cycle.

2. The method as recited in claim 1 is further comprised of the step of performing a validity check of said first effective address in said third clock cycle.

3. The method as recited in claim 1 wherein said step b) is further comprised of the steps of:
   a) calculating said first linear address from said first set of a address components; and
   b) calculating said first effective address from a subset of said first set of address components.

4. A microprocessor circuit for providing both a linear address and an effective address for a memory reference during consecutive clock periods comprising:
   means for providing signals representing a first plurality of address components corresponding to a first memory reference to a first and second combining means during a first clock period, said first plurality of address components being selected by a first start address formation signal issued in said first clock period, and a second plurality of address components corresponding to a second memory reference to said first and second combining means during a second clock period, said second plurality of address components being selected by a second start address formation signal issued in said second clock period, said second clock period being consecutive to said first clock period;

said first combining means for combining the signals representing said first plurality of address components to provide an effective address for said first memory reference during said second clock period and for combining the signals representing said second plurality of address components to provide an effective address for said second memory reference during a third clock period consecutive to said second clock period;

means for providing signals representing a first segment base address corresponding to said first memory reference during said first clock period and a second segment base address corresponding to said second memory reference during said second clock period to said second combining means; and said second combining means for combining the signals representing said first plurality of address components and said first segment base address to provide a linear address for said first memory reference during said second clock period and for combining the signals representing said second plurality of address components and said second segment base address to provide a linear address for said second memory reference during said third clock period.

5. The microprocessor circuit as claimed in claim 4 in which the first combining means comprises a two input adder.

6. The microprocessor circuit as claimed in claim 4 in which the second combining means comprises a three input adder.

7. The microprocessor circuit as claimed in claim 4 further comprising means for determining access violations for a memory reference subsequent to the generation of a corresponding effective address and a corresponding linear address.

8. The microprocessor circuit as claimed in claim 4 in which the means for providing signals representing said first and said second plurality of address components comprises first and second multiplexors coupled to receive at least two address components of said first or second plurality of address components and said first and second start address formation signals during consecutive clock periods, wherein said at least two address components may change every clock period;

said first multiplexor further coupled to a first latch for providing a first component of said at least two address components to said first latch during consecutive clock periods, said first latch having an output coupled to said first combining means and said second combining means, wherein said first component is determined by said first start address formation signal in said first clock period and by said second start address formation signal in said second clock period;

said second multiplexor further coupled to a second latch for providing a second component of said at least two address components to said second latch during consecutive clock periods, said second latch having an output coupled to said first combining means and said second combining means, wherein said second component is determined by said first start address formation signal in said first clock period and by said second start address formation signal in said second clock period;

a third multiplexor coupled to receive said first or second segment base address and said first and second start address formation signals during consecutive clock periods; and said third multiplexor further coupled to a third latch for providing said first or second segment base address to said third latch during consecutive clock periods based on said first and second start address formation signals, respectively, said third latch having an output coupled to said second combining means.

9. The microprocessor circuit as claimed in claim 8 wherein said first component of said at least two address components is the same as said second component of said at least two address components.

10. A memory management system for a microprocessor having a segmentation unit, wherein said segmentation unit receives a clock signal, said segmentation unit comprising:

a three-input adder coupled to a linear address bus, said three-input adder for generating a linear address every clock cycle responsive to a generate address signal;

a two-input adder coupled to an effective address bus, said two-input adder for generating an effective address every clock cycle responsive to said generate address signal;

first and second multiplexors, each coupled to receive a start address formation signal and at least two address components of a set of address components every clock cycle, wherein said start address formation signal and said at least two address components may change every clock cycle;

said first multiplexor further coupled to a first latch for providing a first component of said at least two address components to said first latch wherein said first component is determined by said start address formation signal;

said second multiplexor further coupled to a second latch for providing a second component of said at least two address components to said second latch, wherein said second component is determined by said start address formation signal;

a third multiplexor coupled to receive said start address formation signal and a segment base address every clock cycle, wherein said start address formation signal and said segment base address may change every clock cycle;

said third multiplexor further coupled to a third latch for providing said segment base address to said third latch based on said start address formation signal;

said first latch for holding said first component, said first latch further coupled to said three-input adder and said two-input adder;

said second latch for holding said second component, said second latch further coupled to said three-input adder and said two-input adder; and said third latch for holding said segment base address, said third latch further coupled to said three-input adder.

11. The segmentation unit of claim 10 further comprising means for checking for segment limit and access rights violations.

12. The segmentation unit as recited in claim 10 wherein said start address formation signal is provided during a first clock cycle for a first memory reference and during a second clock cycle for a second memory reference and said generate address signal is provided during said second clock cycle for said first memory reference and during a third clock cycle for said second memory reference.

13. The segmentation unit as recited in claim 10 wherein said first component is one of a relative base index, an instruction pointer address, and an effective address generated in a previous clock cycle, and said second component is one of said relative base index, said effective address, and a displacement.

* * * * *

UNITED STATES PATENT AND TRADEMARK OFFICE
CERTIFICATE OF CORRECTION

PATENT NO.    :   5,408,626
DATED         :   April 18, 1995
INVENTOR(S)   :   Ashish Dixit It is certified that error appears in the above-identified patent and that said Letters Patent is hereby corrected as shown below:

In column 3 at line 41 insert --therein placed in random access memory through the translation process of the page map tables.-- following "information"

In column 7 at line 42 delete "CSLA [--2] and insert --CSLA [2--2]--

In column 8 at line 42 delete "address component" and insert --address components--

Signed and Sealed this

Fourth Day of February, 1997

Attest:

BRUCE LEHMAN

Attesting Officer        Commissioner of Patents and Trademarks